United States Patent [19]

Tamayo

[11] Patent Number: 5,894,591
[45] Date of Patent: Apr. 13, 1999

[54] PERSONAL EMERGENCY RESPONSE COMMUNICATION APPARATUS FOR PAGERS

[76] Inventor: Elizabeth L. Tamayo, 690 W. Arbeth St., Rialto, Calif. 92377

[21] Appl. No.: 08/696,265

[22] Filed: Aug. 13, 1996

[51] Int. Cl.$^6$ .............................. H04B 7/00; H04M 11/00; G08B 5/22
[52] U.S. Cl. ..................... 455/31.2; 455/404; 379/38; 379/45; 340/825.45
[58] Field of Search ........................... 455/31.1, 31.3, 455/31.2, 404, 521; 379/52, 37, 38, 45; 340/825.44, 825.45, 311.1, 825.49, 825.54

[56] References Cited

U.S. PATENT DOCUMENTS

| | | | |
|---|---|---|---|
| 4,057,794 | 11/1977 | Grossfield | 340/825.45 |
| 4,068,097 | 1/1978 | Verriest | 379/38 |
| 5,335,246 | 8/1994 | Yokev et al. | 455/31.3 |
| 5,365,570 | 11/1994 | Boubelik | 379/59 |
| 5,521,582 | 5/1996 | Kingston | 379/37 |
| 5,535,215 | 7/1996 | Hieatt, III | 455/31.3 |

FOREIGN PATENT DOCUMENTS 2 125 597  3/1984  United Kingdom .............. 340/825.45

*Primary Examiner*—Dwayne D. Bost
*Assistant Examiner*—Tracy M. Legree

[57] ABSTRACT

Personal emergency response communication apparatus is a new and useful improvement for pager to access 911 system to call for help (Police, Fire Department and Paramedic). Equipped with a preprogrammed switch to 911 system, a micro computer chip for memory, mini speaker, microphone and an antenna. Upon triggering the emergency 911 switch, an internal preprogrammed system transmits an encoded message to 911 Emergency Response Center in the immediate area. The personal emergency response communication includes at least one communication system, remote communication device, and at least one MSC and PSTN System. In response to a paging message from a paging party, the communications system transmits audible messages corresponding to the paging messages via a communications link. Once connection is completed the "911" number characters will show on the display window of the pager. User can talk on the microphone and listen on the speaker for the emergency operator's response. Audible messages are uniquely possible through forward voice/control channels and reverse voice/control channels,a two-way communication system for real-time interactive conversation. User will be able to disclose nature of the emergency and his/her location;and appropriate action can take place in a few minutes. To end or disconnect transmission, simply turn-off the same switch previously used to activate/start the initial transmission. The right side design of the pager is contoured/rippled for easy grip.

2 Claims, 3 Drawing Sheets

PERSONAL EMERGENCY RESPONSE COMMUNICATION APPARATUS FOR PAGERS

TECHNICAL FIELD

This invention relates to improve pager functions, more specifically to incorporate a Personal Emergency Response/ 911 communication access for pagers.

BACKGROUND OF THIS INVENTION

The inevitable need of people to communicate gave birth to a communication device we now call pagers. Since its conception in the 1970's, the pager technology has gone through leaps and bounds making it a much needed communication device and a multi-billion dollar business.

Originally, these pagers were called "beepers" due to the fact that their main singular operative function was to send beep signals as a message. In its simpliest model, the beepers were invented for internal use, meaning, inside a building or premise as an interdepartamental communication system. They were widely utilized by hospital personnel and other organizations alike.

Although this conventional way to communicate was useful at that time, it was also unfortunately limited to its immediate surroundings. As the demand for a better communication increased, new and better beepers came into existence in the market. In the 1980's there was a slow, but steady growth in beeper communication technology.

Thus, the years of 1990 and 1991 marked the turning point for beeper technology as a personal communication device capable of both internal as well as external communication. Mega telecommunication companies, such as AT&T, Motorola, Nokia & Sony to mention a few, rallied to pioneer and advertise more sofisticated and versatile beepers. Along with new functions and designs came a new term called—pagers. Both terms beeper and pager can be used interchangeably. However, pager is the more appropriate term, which is named after its method of communication transmittal system known as the paging system.

Although, the beeper has some usefulness left, pagers on the other hand are more flavorable to the public, due to their new "Hi-Tech" multi-functional features and designs. From 1992 to present, the diversity in personal communication has exploded to keep up with busy and demanding life styles of the public. Accordingly, some if not all of the functions and features available in the market for prior art pagers are as follows:

(a) portable, light-weight and made with durable easy to clean materials;

(b) battery operated (one AA size) no charging required and can even tell user "cell low" when battery is low;

(c) beeps or vibrates to inform user of incoming call;

(d) voice mail by numeric, alphanumeric & two-way only paging through Internet;

(e) a camilian, easy to change case color (available only on certain type pagers).

With all of the stated functions prior art pagers has come a long way since its conception. It has satisfied most but not all of the demanding needs of the user. Prior art pagers are the personal communication of today's society.

To take the pager communication even further is the purpose of this invention. Personal emergency response communication is a new and useful improvement function to pagers. This invention incorporates a 911 access function to call for help, be it the police, the fire department or the paramedics. This invention added to the previously stated prior art pager features will be the pager of the future. Personal Emergency Response Communication paging apparatus is an obvious necessity the society needs. This is an invention that can save the life of its user. The advantages are, but not limited to as follows:

(a) 911 access—for life threatening situations;

(b) interactive or real-time conversation, with forward voice & control channels and reverse voice and control channels communication;

(c) a non-violent protection that can save lives;

(d) cheaper compared to a cellular phone;

(e) easy to use with one 911 switch to activate and disconnect;

(f) a micro computer chip for memory used for the preprogrammed 911 access and for confirmation command;

(g) more compact to carry around compared to cellular phones;

(h) would appeal to people of all background, specially beneficial to the youngsters (teens), to the elderly, to the sick and frail and to women too;

(i) will feasibly increase pager sales;

(j) lastly, the 911 number characters will appear on the display window upon connection to confirm transmission.

It is an important improvement that will enhance the personal communication technology of today and tomorrow.

SUMMARY OF INVENTION

Personal Emergency Response Communication paging apparatus in its entirety is a new and useful improvement for pager communication. Pioneering the two-way, real-time conversation interactive communication for pagers. The Personal Emergency Response Communication includes at least one communication system, remote communication devices, and at least one MSC and PSTN System. In response to a paging message from a paging party, the communications system transmits audible messages corresponding to the paging messages via a communication link. The forward voice and control channels and reverse voice and control channels make the interactive audible message process possible. The uniqueness of this present invention is that the process is reversed. The user starts/initiates the communication instead of just receiving the messages compared to prior art. Also, prior art is only capable of receiving numeric, alphanumeric and transmitting text messages. It is easy to activate with only one preprogrammed switch to 911 system to call for help. Also equipped with a micro computer chip for memory, a mini speaker, microphone and an antenna to complete a clear transmission process. Also, 911 numerical characters will show on the window display of the pager as a confirmation message that connection to 911 system has been completed. To end or disconnect transmission, simply turn off the same switch used to activate initial transmission. As you can see this present invention is very easy to use "user friendly" with only one switch to operate. The impact of this invention will revolutionize the technological fields of pager personal communication and personal protection as well. The inventor has recognized the urgency and invaluableness and the many benefits it has to offer. The present invention is the pager of the future.

Figure 1:
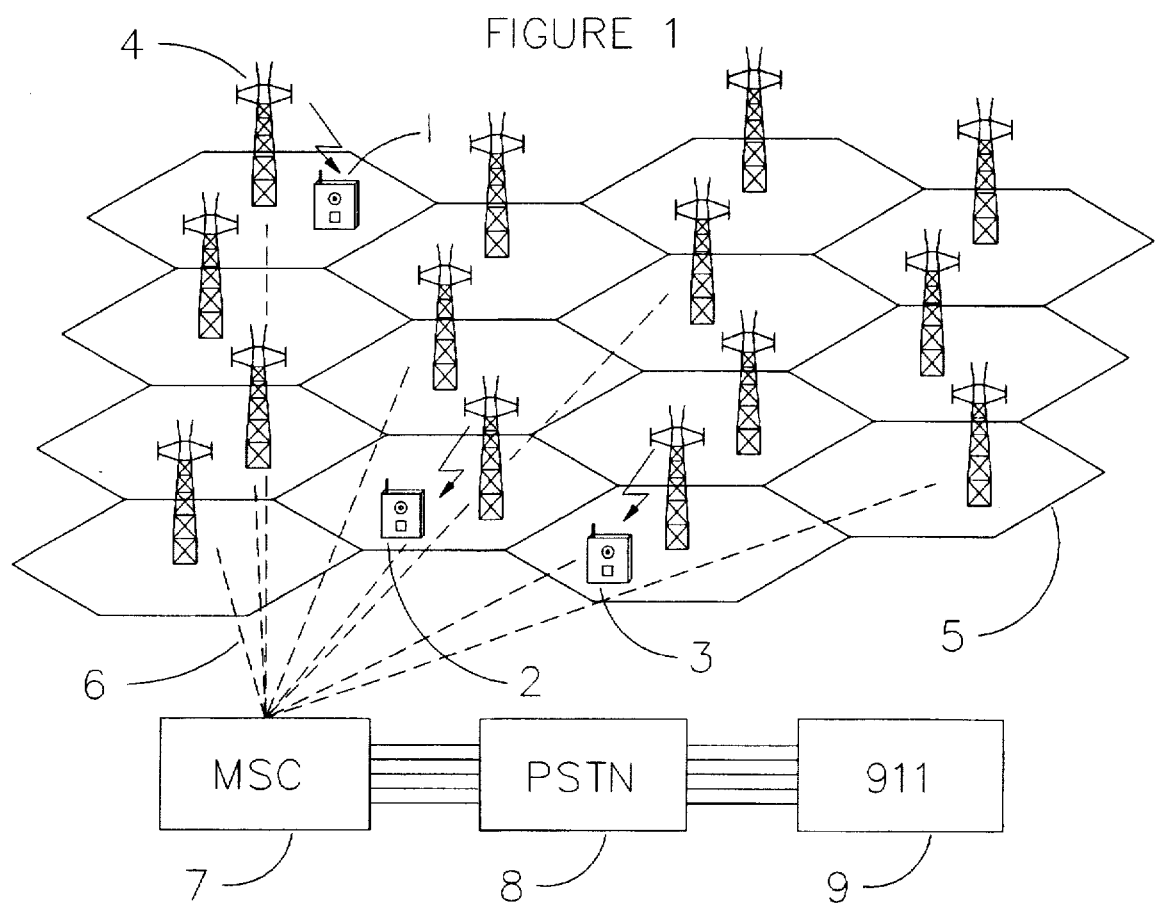
FIG. 1 Is a block illustration of the communication process.

REFERENCE NUMERALS IN DRAWINGS 1,2,3 & 10—pager user
4 & 11—base station tower
5—block base station towers
6—transmission signal from base station towers to Mobile Switching Center (MSC)
7 & 12—Mobile Switching Center (MSC)
8 & 13—Public Switched Telephone Network (PSTN)
9 & 14—911 system/station
15—reverse voice channel, reverse control channel
16—forward voice channel, forward control channel
17 & 20—display window on pagers
18—911 acknowledgement message
19—antenna
21—contoured/rippled design
22—mini speaker
23—microphone
24—ON/OFF switch from prior art
25—ON/OFF switch for 911 system
26—micro computer chip

DETAILED DESCRIPTION

Referring now to the drawings (FIGS. 1 to 6) in which like numerals indicate like elements throughout the various figures. FIG. 1 is a block illustration of how the communication transmittion to 911 system is transmitted. The pager users 1,2 and 3 activates the 911 switch 25, more than one user is illustrated to show the accessibility of the invention. Users 1,2 and 3 can access the 911 system at the same time if necessary. Otherwise, access is as per emergency only. The preprogrammed message to access 911 system is stored in the micro computer chip 26. The message is picked up by the base station towers 4 closest to the user. The block illustration of the base station towers 5 explains which tower will respond to the user in a wide area. The corresponding tower transmits the message 6 to the Mobile Switching Center (MSC) 7. The MSC 7 switches the message to Public Switched Telephone Network (PSTN)8. PSTN transmits the message to the 911 system 9. FIG. 1 describes the first part of the two-way communication transmittion process to support this present invention.

Figure 2:
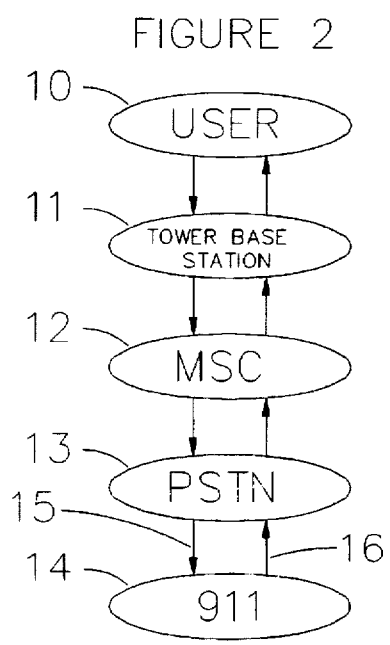
FIG. 2 Is a flow chart diagram of a two-way, real-time conversation transmission process.

FIG. 2 is a flow chart diagramming the steps from start to end of the transmittion to accomplish the two-way, interactive communication process claimed. The pager user 10 initials the transmittion by activating the preprogrammed 911 switch 25 to 911 system. The base station tower 11 closest to the location of the user picks up the transmission. The Mobile Switching Center (MSC) 12 receives the transmission and sends it to the Public Switched Telephone Network (PSTN)13. The PSTN connects the user to 911 system 14. Once the 911 operator answers, the two-way interactive communication can begin. This two-way communication is real-time conversation possible through the reverse voice/control channels 15 and forward voice/control channels 16. The pager user 10 utilizes the reverse channels 15 to communicate and 911 operator utilizes the forward channels 16 to communicate.

Figure 3:
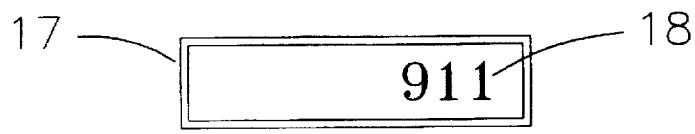
FIG. 3 Is an illustration of the connection confirmation message displayed on the window of the pager.
Figure 4:
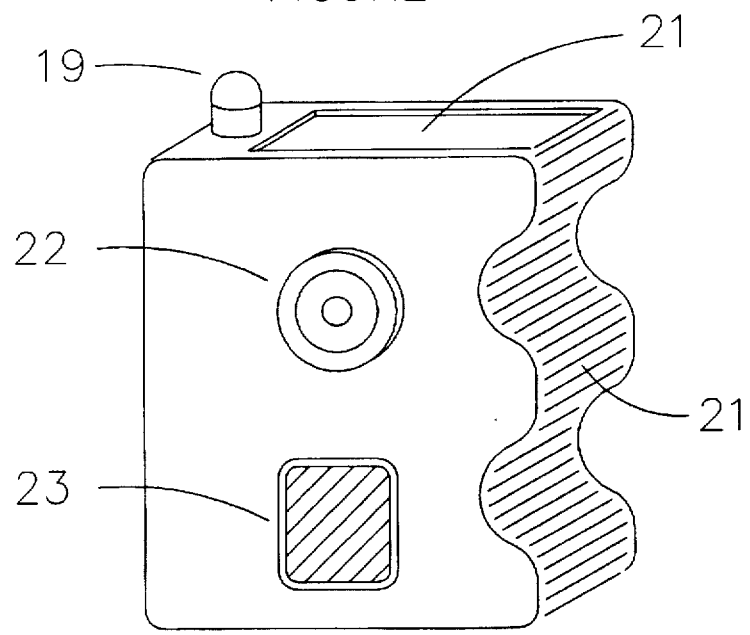
FIG. 4 Is a front view diagram of a pager with the present invention incorporated.
Figure 6:
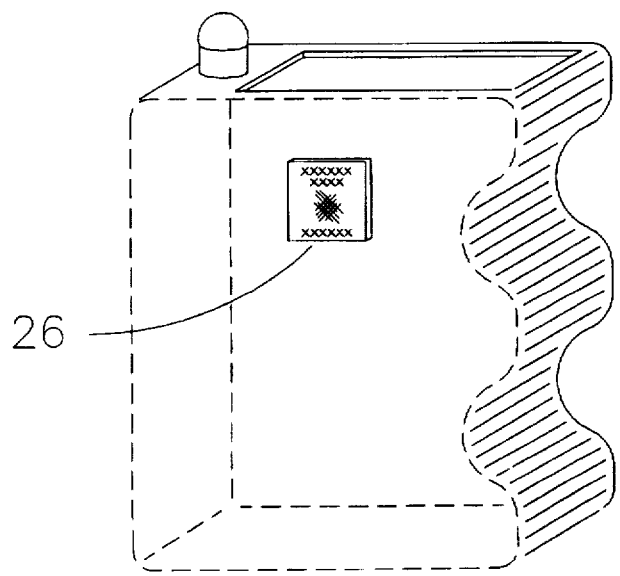
FIG. 6 Is a micro computer chip inside a pager device.
Figure 5:
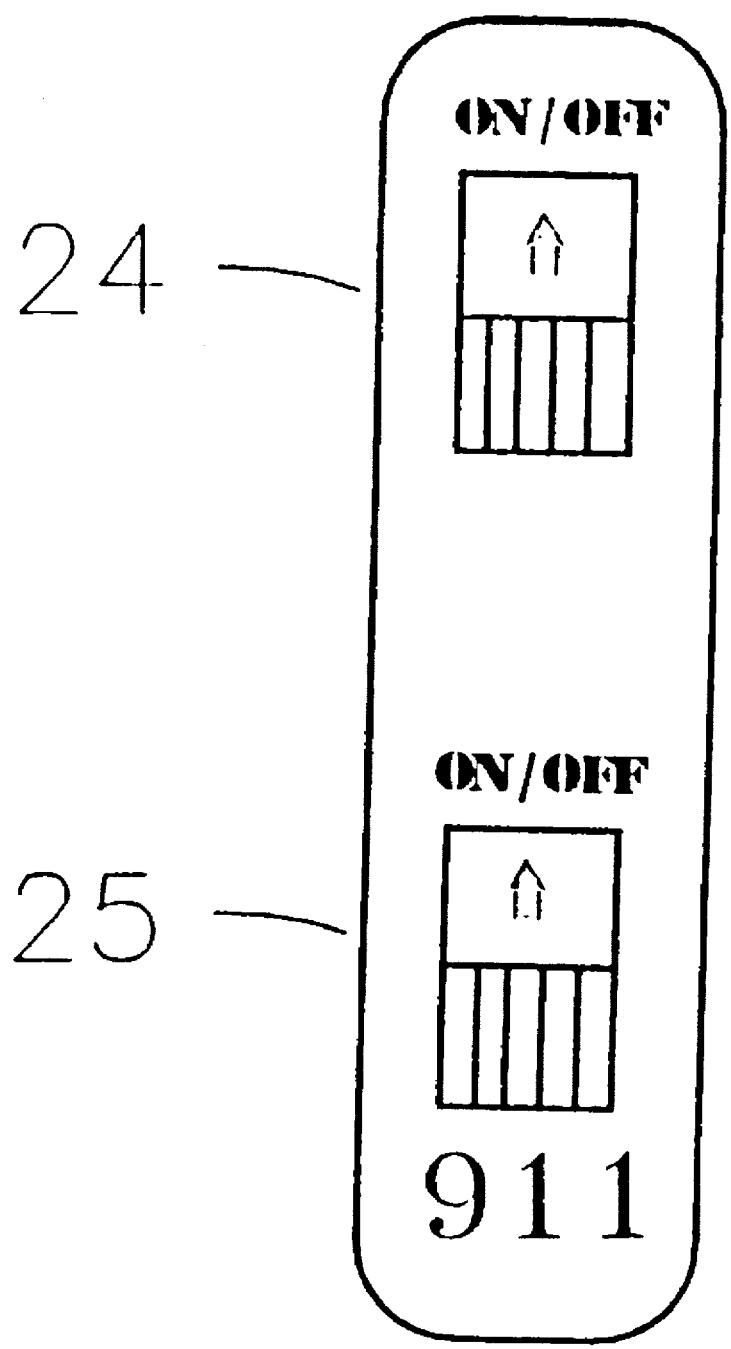
FIG. 5 Is a left side view diagram of a pager with the 911 switch installed.

FIG. 2 describes the method of how the two-way audible messages are transmitted and received. FIG. 2 interrelates with FIG. 1, completing the process of communication as claimed in the present invention. FIG. 3 is an acknowledgement message 18 on the pager display window 19. It informs the pager user that transmission to 911 system has been connected. FIG. 4 is a front view diagram of a pager with all the necessary components incorporated to complete the process of communication. After the pager user sees the 911 acknowledgement message 18 on the display window 20, the user can begin to communicate. User can talk through the microphone 23 sending audible messages to the 911 operator. User can also hear the audible responses of the 911 operator though the mini speaker 22. The antenna 19 helps makes the communication reception clearer. The user can also hold the pager on the palm of his/her hand while communicating and move the pager next to the mouth to talk and to the ear to listen and vise versa, if necessary. The right side of the pager is contoured for easy grip. FIG. 4 is a diagram of a pager to show how the required added components 19,22,23 and 21 can be viewed as a full functional pager apparatus. FIG. 5 is a left side view diagram of a pager with the 911 switch 25 installed. The 911 switch 25 is located at the lower end portion and can be moved up or down. To activate 911 system, push up and to end or disconnect, push down. The other switch illustrated 24 which is located at the upper end position, is an On and Off switch for prior art. The purpose of illustrating both switches is to show descriptive location in incorporating the components necessary for this invention. May I remind the reader that the invention is a new and useful improvement to pagers/prior art. The switch 24 is what makes the prior art operate its current features; and 911 switch 25 is an added function that is activated only incase of an emergency. FIG. 6 is a micro computer chip 26 used for memory to preprogram the 911 transmission and confirmation command. The inventor has chosen to illustrate the micro computer chip 26 solely for the purpose of identifying necessary components of the present invention.

It should be comprehended that the particular embodiments described herein have been disclosed by way of example and that other modifications may occur to those skilled in the art without departing from the scoop and principle of the affixed claims.

I claim:

1. In or for a personal emergency response communication paging apparatus to transmit and receive audible real-time/interactive messages, said paging apparatus comprising:

an activation device initiating an internal signal to begin the paging process;

a memory device preprogrammed to supply encoded protocol confirmation notification and emergency transmission signals to corresponding remote control channels;

a display device for providing visual notification of connection to a emergency response system, in response to transmission of the initial internal signal from the paging apparatus;

an instrument for intensifying feeble sound or transmitting live sound messages responsive to sender's and end receiver's voice;

a device that produces sound waves from electronic input and output real-time/live sound messages;

a wire device radiating waves into space or receiving them from space for clear simultaneous communication reception.

2. In or for an emergency response communication paging system including a personal emergency response communication paging apparatus operable to transmit and receive audible real-time/interactive messages, said system comprising:

communication means, responsive to transmitting and receiving said audible real-time/interactive messages via a paging communication link and a plurality of remote communication devices;

at least one Mobile Switching Center (MSC) and Public Switching Telephone Network (PSTN), to transmit and receive audible interactive and simultaneous messages, responsive of said remote communication devices;

said communication means further operative to transmit and receive audible real time/interactive messages through reverse voice/control channels and forward voice/control channels after receiving a visual acknowledgment of connection to said emergency response communication paging system in response to an initial internal signal transmitted to said emergency response communication paging system from said personal emergency response paging apparatus.

\* \* \* \* \*